(12) United States Patent
Ding et al.

(10) Patent No.: US 10,632,998 B2
(45) Date of Patent: Apr. 28, 2020

(54) ADAPTIVE DRIVING BEHAVIOR ADJUSTING METHOD FOR ELECTRIC VEHICLE

(71) Applicant: NIO NEXTEV LIMITED, Hong Kong (CN)

(72) Inventors: Chenxi Ding, Hong Kong (CN); Mingyin Hu, Hong Kong (CN); Bin He, Hong Kong (CN)

(73) Assignee: NIO NEXTEV LIMITED, Hong Kong (CN)

( * ) Notice: Subject to any disclaimer, the term of this patent is extended or adjusted under 35 U.S.C. 154(b) by 0 days.

(21) Appl. No.: 16/096,517

(22) PCT Filed: Apr. 14, 2017

(86) PCT No.: PCT/CN2017/080631
§ 371 (c)(1),
(2) Date: Oct. 25, 2018

(87) PCT Pub. No.: WO2017/186002
PCT Pub. Date: Nov. 2, 2017

(65) Prior Publication Data
US 2019/0111926 A1    Apr. 18, 2019

(30) Foreign Application Priority Data

Apr. 27, 2016  (CN) .......................... 2016 1 0268587

(51) Int. Cl.
*B60W 30/182*   (2020.01)
*B60W 30/14*    (2006.01)
(Continued)

(52) U.S. Cl.
CPC ........ *B60W 30/182* (2013.01); *B60W 30/143* (2013.01); *B60W 50/082* (2013.01); *B60W 50/14* (2013.01); *B60L 2260/52* (2013.01)

(58) Field of Classification Search
USPC .......................................................... 701/36
See application file for complete search history.

(56) References Cited

U.S. PATENT DOCUMENTS 9,079,586 B2 * 7/2015 Crombez ............ B60W 30/182
2006/0278449 A1 12/2006 Torre-Bueno
(Continued)

FOREIGN PATENT DOCUMENTS

CN  102529679  7/2012
CN  102700426  10/2012
(Continued)

OTHER PUBLICATIONS

International Search Report prepared by the State Intellectual Property Office of the P.R. China dated Jun. 29, 2017, for International Application No. PCT/CN2017/080631.
(Continued)

*Primary Examiner* — Tyler D Paige
(74) *Attorney, Agent, or Firm* — Sheridan Ross P.C.

(57) ABSTRACT

The invention provides an adaptive driving behavior adjusting method for an electric vehicle, intended for solving the problem that existing energy recovery approaches fail to fully satisfy endurance mileage extending requirements of electric vehicles and the problem that a charging or battery-swapping time cannot be accurately determined. The method comprises the steps of: estimating an endurance mileage of the electric vehicle; acquiring information of a location of the nearest charging pile or a destination by means of a GPS; acquiring information of a lane in which the electric vehicle is currently traveling by means of the GPS; and the electric vehicle selectively enters a forced adaptive driving mode or an optional adaptive driving mode, based on endurance mileage of the electric vehicle, the information of the location of the charging pile or the destination and the information of the lane. By means of the (Continued)

method, the electric vehicle can be prevented from roadside breakdown or failing to arrive at the destination due to failure to get recharged in time, and a driver can be warned to extend the endurance mileage in time when feasible, so that not only can electric energy be saved, thereby increasing the endurance mileage, but also breakdown due to power shortage can be prevented and the driving experience can be improved.

9 Claims, 3 Drawing Sheets

(51) Int. Cl.
*B60W 50/08* (2020.01)
*B60W 50/14* (2020.01)

(56) References Cited

U.S. PATENT DOCUMENTS

| | | | | |
|---|---|---|---|---|
| 2010/0181827 A1* | 7/2010 | Cunningham | ............ | B60L 3/04 307/9.1 |
| 2012/0109515 A1* | 5/2012 | Uyeki | ................ | G01C 21/3469 701/423 |
| 2012/0123619 A1* | 5/2012 | Chen | ..................... | B60L 3/0046 701/22 |
| 2013/0221928 A1* | 8/2013 | Kelty | ..................... | B60L 58/13 320/134 |
| 2016/0023557 A1* | 1/2016 | Dimke | ..................... | B60L 5/42 320/108 |
| 2016/0052512 A1* | 2/2016 | Buford | ................. | B60W 20/50 701/22 |
| 2017/0353042 A1* | 12/2017 | Liu | ................... | H01M 10/4257 |

FOREIGN PATENT DOCUMENTS

| | | |
|---|---|---|
| CN | 102745201 | 10/2012 |
| CN | 102837697 | 12/2012 |
| CN | 103935259 | 7/2014 |
| CN | 104442825 | 3/2015 |
| CN | 105046356 | 11/2015 |
| DE | 102013000548 | 4/2014 |
| JP | 2001-289643 | 10/2001 |
| TW | 201231331 | 8/2012 |

OTHER PUBLICATIONS

Official Action with English Translation for China Patent Application No. 201610268587.3, dated Sep. 27, 2017, 11 pages.
Notice of Grant with English Translation for China Patent Application No. 201610268587.3, dated Nov. 7, 2017, 5 pages.

* cited by examiner

ADAPTIVE DRIVING BEHAVIOR ADJUSTING METHOD FOR ELECTRIC VEHICLE

CROSS REFERENCE TO RELATED APPLICATIONS

This application is a national stage application under 35 U.S.C. 371 and claims the benefit of PCT Application No. PCT/CN2017/080631 having an international filing date of 14 Apr. 2017, which designated the United States, which PCT application claimed the benefit of China Patent Application No. 201610268587.3 filed 27 Apr. 2016, the disclosure of each of which are incorporated herein by reference.

TECHNICAL FIELD

The invention relates to an electric vehicle, and in particular to an adaptive driving behavior adjusting method of an electric vehicle.

BACKGROUND ART

Energy crisis and environmental problems have become important factors restricting global development. New energy vehicles, chiefly electric vehicles, have become one of the effective means to alleviate energy pressure and reduce environmental pollution. As electric vehicles are driven by pure electric power, compared with traditional internal-combustion engine vehicles or hybrid vehicles, the electric vehicles can enhance the energy structure, improve the peak-to-valley balance of the electrical grid system, achieve low-emission travel, and reduce exhaust gas, waste heat and noise pollution. Now, electric vehicles have entered an initial stage of industrialization on a global scale.

For a pure electric vehicle with a traction battery as an energy source, the evaluation indicators therefor include the endurance mileage, the energy consumption per unit mileage, etc. Among them, the endurance mileage is an important measure of the economic performance of an electric vehicle, and a great many studies are also mainly focused on how to enhance the endurance mileage of the electric vehicle. The larger the capacity of a battery pack is and the stronger energy storage capacity the electric vehicle has, the longer the endurance mileage is. However, the increase in the battery pack increases the vehicle mass, thus affecting the performance of the vehicle and increasing the production costs.

In general, the electric vehicle can recover energy through regenerative braking to increase the endurance mileage. However, relying solely on regenerative braking is not enough. It is necessary to seek other methods to balance the power performance, economic performance and safety performance of the electric vehicle and improve the endurance mileage of the electric vehicle. In addition, unlike hybrid vehicles, for pure electric vehicles, the location of charging piles or battery swap stations should be taken into full account, so as to prevent roadside breakdown from power shortage due to the lack of consideration of the endurance mileage and the location of charging piles.

Accordingly, there is a need in the art for a novel driving behavior adjusting method for an electric vehicle to solve the above problems.

SUMMARY OF THE INVENTION

The invention is intended to solve the problem that existing energy recovery modes fail to fully satisfy endurance mileage extending requirements of electric vehicles and the problem that a charging or battery-swapping time cannot be accurately determined. To this end, the invention provides an adaptive driving behavior adjusting method for an electric vehicle. The method comprises the steps of: estimating an endurance mileage of the electric vehicle; acquiring information of a location of the nearest charging pile or a destination; acquiring information of a lane in which the electric vehicle is currently traveling; and the electric vehicle selectively enters a forced adaptive driving mode or an optional adaptive driving mode, based on the endurance mileage of the electric vehicle, the information of the location of the charging pile or the destination and the information of the lane.

In the application, "forced adaptive driving mode" means a mode that the electric vehicle enters itself without confirmation by a driver, i.e. when an ECU determines that relevant conditions are satisfied, the electric vehicle directly enters the mode. In the forced adaptive driving mode, the electric vehicle travels at the most economical speed to maximize the endurance mileage and prevent roadside breakdown due to lack of power. "Optional adaptive driving mode" means a mode which the electric vehicle enters only after confirmation by the driver, i.e. when the ECU determines that the relevant conditions are satisfied, the electric vehicle first asks the driver whether to enter the mode, and the driver confirms whether to enter the mode. In the optional adaptive driving mode, the electric vehicle also travels at the most economical speed to maximize energy savings and thus increase the endurance mileage when feasible. Compared with the forced adaptive driving mode, the optional adaptive driving mode corresponds to the case where the endurance mileage extending demand is not urgent, and the driver can choose either to extend the endurance mileage or not. Of course, the driver has the right to decide to exit at any time, whether in the forced adaptive driving mode or the optional adaptive driving mode. In other words, although the forced adaptive driving mode can be entered without confirmation by the driver, the driver still has the right to exit the mode at any time, which is mainly for safety reasons. Furthermore, in the above description, information of the location of the nearest charging pile or the destination and the information of the lane are acquired, preferably by a GPS, but it is obvious to those skilled in the art that other suitable acquisition methods can also be selected as needed, for example, by other navigation systems such as BeiDou Navigation Satellite System, or through real-time traffic reports.

In a preferred embodiment of the above adaptive driving behavior adjusting method, the step of estimating an endurance mileage of the electric vehicle further comprises: acquiring state of charge of the electric vehicle; acquiring an actual vehicle speed of the electric vehicle; acquiring a load state of the electric vehicle; acquiring terrain of a current road; and estimating the endurance mileage of the electric vehicle based on the state of charge, the actual vehicle speed, the load state and the terrain of the current road.

Those skilled in the art can understand that the state of charge of the electric vehicle can be acquired in real time via a battery management system (BMS) installed inside or outside a battery pack; the actual vehicle speed can be acquired by the ECU in real time; the load state can also be acquired in real time by the ECU or other sub-controllers; and the terrain of the current road can be provided by the GPS, and can also be provided by other navigation devices or systems. Based on this information and using corresponding methods or models, the real-time endurance mileage of the electric vehicle can be estimated. There are various methods or models for estimating the endurance mileage in the prior art. How to estimate the endurance mileage is not the focus of this application, and thus will not be described in detail herein. In addition, the terrain mainly refers to uphill or downhill terrain and turns in the path, road surface evenness, etc. Taking the uphill or downhill as an example, the reason for considering the uphill or downhill terrain is that going uphill and going downhill at the same speed will have an opposite effects on the endurance mileage. Therefore, when the endurance mileage is to be determined, the terrain in which the vehicle is traveling must be considered.

In a preferred embodiment of the above adaptive driving behavior adjusting method, the information of the lane includes an average vehicle speed, the terrain, and a speed limit, and/or the load state includes an air conditioning state and a low-voltage load state.

It can be seen by those skilled in the art that the invention needs to consider the terrain when estimating the endurance mileage, and also needs to consider the terrain when combining the endurance mileage and the information of the lane to determine whether to enter the adaptive driving mode, because the terrain information itself is part of the information of the lane. In other words, the method of the invention is doubly dependent on the terrain of real-time road conditions. In addition, the air conditioning state and the state of low-voltage loads such as a radio, a display and lighting lamps can be acquired by corresponding sub-controllers or directly from the ECU.

In a preferred embodiment of the above adaptive driving behavior adjusting method, when the distance between the electric vehicle and the charging pile or destination is greater than the endurance mileage but the difference therebetween is less than an upper threshold distance, or when the distance between the electric vehicle and the charging pile or destination is less than the endurance mileage but the difference therebetween reaches a lower threshold distance, the electric vehicle enters the forced adaptive driving mode.

Those skilled in the art can understand that, when the distance between the electric vehicle and the charging pile is greater than the endurance mileage, it means that even if the driver immediately drives the vehicle towards the charging pile, the vehicle cannot arrive before the remaining electric energy is exhausted, in which case the ECU can decide to directly enter the forced adaptive driving mode without prior approval of the driver. Similarly, when the distance between the electric vehicle and other destinations (such as a battery swap station) is greater than the endurance mileage, it also means that the electric vehicle, following the current driving state, cannot arrive before the remaining electric energy is exhausted, so it is necessary to enter the forced adaptive driving mode immediately. In practice, even if the distance between the electric vehicle and the charging pile or destination is not greater than the endurance mileage, but the difference between the two reaches a certain threshold, the electric vehicle should also be caused to enter the forced adaptive driving mode.

More specifically, in an activation condition for the electric vehicle to enter the forced adaptive driving mode, the difference between the distance between the electric vehicle and the charging pile or destination and the driving endurance mileage needs to be within a certain threshold endurance mileage. This means that after entering the forced adaptive driving mode, the electric vehicle can reach the charging pile or destination before the remaining electric energy is exhausted. The threshold endurance mileage includes an upper threshold distance and a lower threshold distance, and can be estimated according to factors such as the mileage by which the forced adaptive driving mode can increase the driving endurance mileage and the congestion state of different cities. For example, supposing that the estimated endurance mileage of the electric vehicle in the current state is 20 KM, and if the estimated endurance mileage is 50 KM in the forced adaptive driving mode, the endurance mileage is increased by 30 KM, that is, the upper threshold distance is 30 KM at this time, however, considering the road traffic environment impact and the endurance mileage estimation error, a proportional coefficient such as 80% can be added, that is, the upper threshold distance at this time is 24 KM. Similarly, the upper threshold distance in different current states can be estimated in real time or intermittently. In practice, the upper threshold distance can be selected as other numerical values according to experience or needs. The lower threshold distance can be adjusted according to the congestion situation of different cities, for example, selected within the endurance mileage of 10-30 KM. Otherwise, once the road conditions continue to deteriorate, as a result, the vehicle still cannot reach the charging pile or the battery swap station before the remaining electric energy is exhausted. Therefore, the lower threshold distance is set to leave a margin for unexpected conditions. Of course, the lower threshold distance can also be selected as other numerical values as needed.

In a preferred embodiment of the above adaptive driving behavior adjusting method, when the state of charge of the electric vehicle is less than threshold state of charge and the average vehicle speed is greater than a threshold vehicle speed, the electric vehicle enters the optional adaptive driving mode.

Those skilled in the art will appreciate that if the battery has sufficient electric energy, there is no need to frequently warn the driver to enter the adaptive mode. On the contrary, when the state of charge is less than a certain value or ratio, for example, only 30% left (this ratio can be adjusted as needed), the determination of whether the adaptive driving mode is satisfied can be started. At the same time, since the optional adaptive driving mode is not urgent, it should be executed when the vehicle speed is appropriate. Therefore, the invention requires the average vehicle speed to be greater than the threshold vehicle speed (for example, 40 KM/hour) before initiating the determination. When the condition for the optional adaptive driving mode is satisfied, the vehicle asks the driver visually or audibly whether to enter the mode, and the driver can select whether to enter or not through a touch screen or an audio response.

In a preferred embodiment of the above adaptive driving behavior adjusting method, when the conditions for entering the forced adaptive driving mode and for entering the optional adaptive driving mode are simultaneously satisfied, the electric vehicle preferentially enters the forced adaptive driving mode.

As described above, since the forced adaptive driving mode is more urgent, it has a higher priority than the optional adaptive driving mode, and when the two conditions are simultaneously satisfied, the electric vehicle is preferentially caused to enter the forced adaptive driving mode.

In a preferred embodiment of the above adaptive driving behavior adjusting method, the threshold vehicle speed is 40 KM/hour; and/or the lower threshold distance is from 10 to 30 KM.

As described in the following specific implementations, the electric vehicle usually achieves the maximum endurance mileage at the speed of about 40 KM/hour. When the vehicle speed is greater than 40 KM/hour, the higher the speed is, the lower the endurance mileage is, and when the vehicle speed is less than 40 KM/hour, the higher the vehicle speed is, the higher the endurance mileage is. As described above, the lower threshold distance is to leave a margin for subsequent changes in road conditions, and to prevent the failure to reach the destination before the electric energy is exhausted due to the deterioration of road conditions. As described above, the threshold distance may be adjusted according to the congestion situation of different cities, for example, ranging from 10 to 30 KM. Of course, the threshold distance can also be selected as other numerical values as needed.

In a preferred embodiment of the above adaptive driving behavior adjusting method, when the electric vehicle enters the forced adaptive driving mode while satisfying the condition for the optional adaptive driving mode, the electric vehicle cruises at a constant speed of 40 KM/hour with hazard warning flashers turned on.

Those skilled in the art can understand that the entry of the electric vehicle into the forced adaptive driving mode means that endurance mileage extending operation must be performed, otherwise the vehicle may not be able to reach a supply station (such as a charging pile or a battery swap station) before the electric energy is exhausted. Satisfying the condition of the optional adaptive driving mode means that the average vehicle speed of the current road is higher than 40 KM/hour, then the best choice at this time is to cruise at the constant speed of 40 KM/hour, so that the maximum endurance mileage can be achieved. At the same time, driving below the average vehicle speed basically does not affect other vehicles on the same road, and there is also basically no risk of rear-end collision with other vehicles. However, it should be noted that the above "cruising at the constant speed of 40 KM/hour" does not mean that the vehicle speed must always be 40 KM/hour. At this time, the driver or other vehicle safety system such as an anti-collision system can still intervene, because even if the average speed is higher than 40 KM/hour, it is entirely possible that the speed of a vehicle in front of the host electric vehicle is lower than 40 KM/hour, in which case the driver or other vehicle safety systems can intervene in time according to the actual situation to prevent a collision event. Once the emergency is relieved, the ECU can re-adjust the vehicle speed to 40 KM/hour to cruise at a constant speed. In addition, it should be noted that the "forced adaptive driving mode" is an emergency mode set to prevent roadside breakdown from power shortage. Therefore, once entering this mode, it is better for the electric vehicle to turn on the hazard warning flashers to warn surrounding vehicles so as to minimize the possibility of collision with the surrounding vehicles.

In a preferred embodiment of the above adaptive driving behavior adjusting method, when the electric vehicle enters the forced adaptive driving mode but does not satisfy the condition for the optional adaptive driving mode, the electric vehicle travels at the average vehicle speed with the hazard warning flashers turned on.

Those skilled in the art can understand that the entry of the electric vehicle into the forced adaptive driving mode means that the endurance mileage extending operation must be performed, otherwise the electric vehicle may not be able to reach the supply station (such as the charging pile or the battery swap station) before the electric energy is exhausted. Not satisfying the condition of the optional adaptive driving mode means that the average vehicle speed of the current road is lower than 40 KM/hour, then the best choice now is to drive at the real-time average vehicle speed, so that the maximum endurance mileage can be achieved. Similar to the above situation, the above "driving at the average vehicle speed" does not mean that the electric vehicle must always travel at the average vehicle speed. At this time, the driver or other vehicle safety systems such as an anti-collision system can still intervene, because it is entirely possible that a vehicle ahead is below the average vehicle speed, in which case the driver or other vehicle safety systems can intervene in time according to the actual situation to prevent a collision event. Once the emergency is relieved, the ECU can re-adjust the vehicle speed to the average vehicle speed to achieve the maximum endurance mileage. As mentioned above, the "forced adaptive driving mode" is an emergency mode set to prevent roadside breakdown from power shortage. Once entering this mode, it is better for the electric vehicle to turn on the hazard warning flashers to warn surrounding vehicles so as to minimize the possibility of collision with the surrounding vehicles.

In a preferred embodiment of the above adaptive driving behavior adjusting method, when the electric vehicle enters the optional adaptive driving mode, the electric vehicle prompts the driver to confirm whether to enter the optional adaptive driving mode to increase the endurance mileage. This has been described in detail above and is not to be further stated here.

In summary, when the method of the invention is employed, the vehicle can be caused to enter the forced adaptive driving mode or the optional adaptive driving mode in a timely manner. By means of the forced adaptive driving mode, reckless driving can be avoided, which may lead to a failure to recharging in time, or a failure to reaching the destination, and by means of the optional adaptive driving mode, the driver can be warned to extend the endurance mileage in time under feasible conditions, so that electric energy can be saved, the endurance mileage can be accordingly increased, the electric vehicle can be prevented from breaking down due to power shortage and the driving experience can be improved.

DETAILED DESCRIPTION OF EMBODIMENTS

Figure 1:
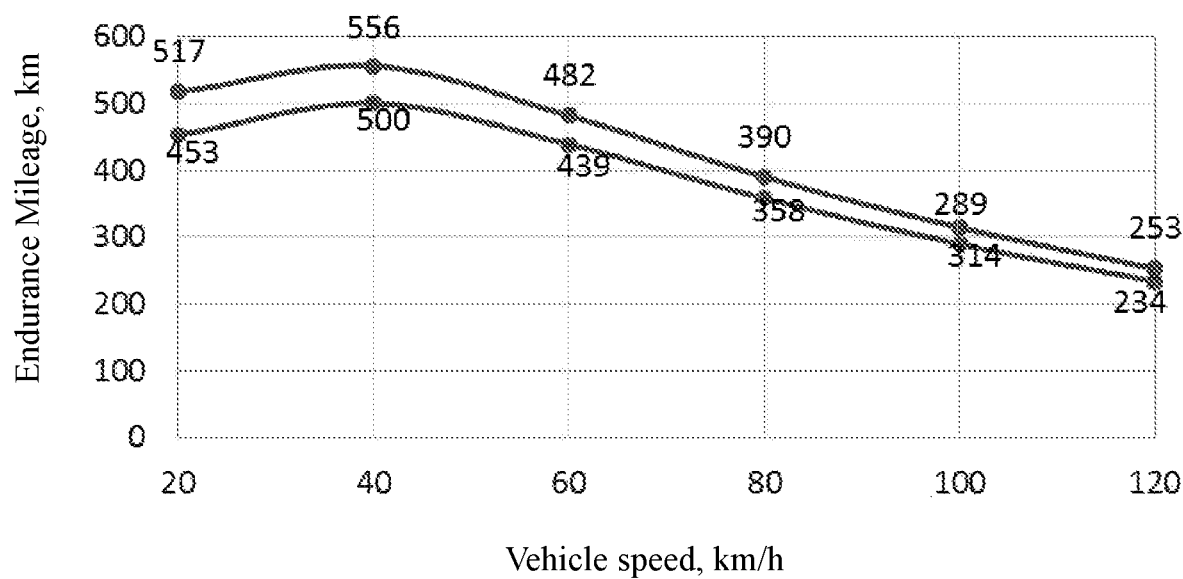
FIG. 1 illustrates a simulation result diagram of endurance mileage of two electric vehicles with different parameters such as different vehicle weight and battery power.

The preferred embodiments of the invention are described below with reference to the accompanying drawings. Referring first to FIG. 1, the diagram illustrates a simulation result of the endurance mileage of two electric vehicles with different parameters such as different vehicle weight and battery power. As can be seen from FIG. 1, for electric vehicles with different parameters, the maximum endurance mileage is usually achieved at the speed of about 40 KM/hour. When the vehicle speed is greater than 40 KM/hour, the higher the speed is, the lower the endurance mileage is; and when the vehicle speed is less than 40 KM/hour, the higher the vehicle speed is, the higher the endurance mileage is. Therefore, through intelligent adjustment, the vehicle speed can be as close to 40 KM/hour as possible, thereby increasing the endurance mileage of the electric vehicle and improving the economic performance of the vehicle.

Figure 2:
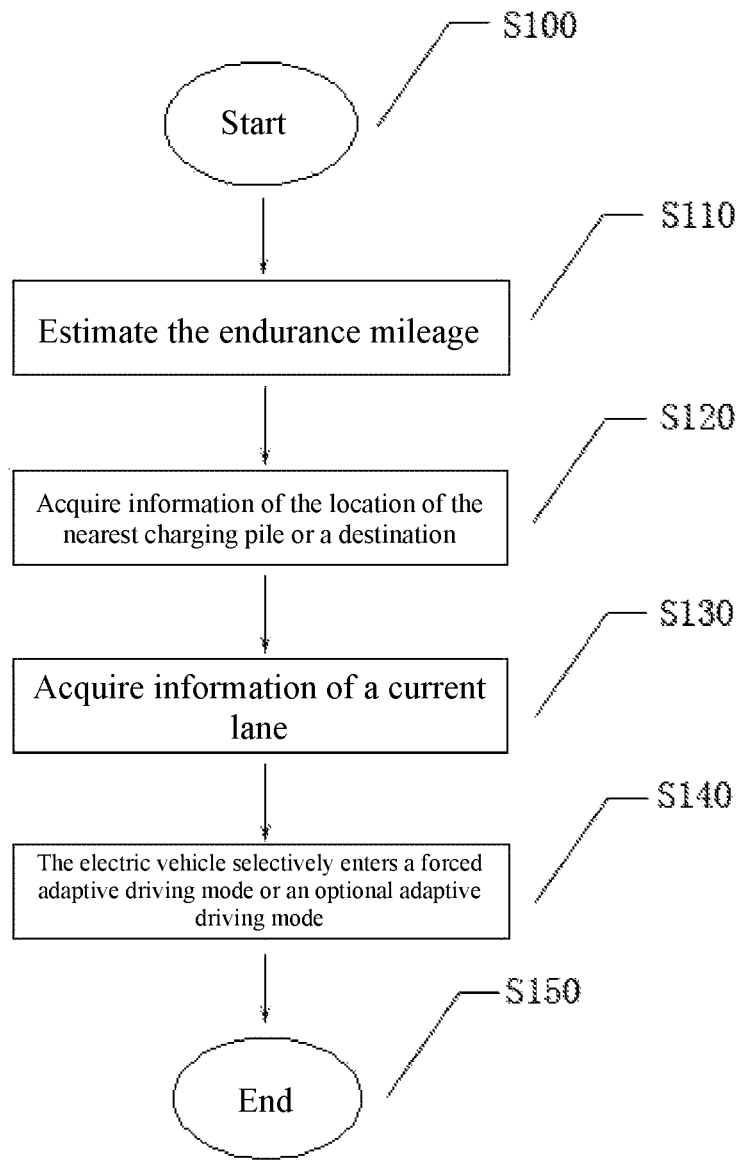
FIG. 2 is a flow chart of an adaptive driving behavior adjusting method according to the invention.

Referring next to FIG. 2, the adaptive driving behavior adjusting method of an electric vehicle of the invention comprises the steps of: estimating an endurance mileage of the electric vehicle; acquiring information of a location of the nearest charging pile or a destination by means of a GPS; acquiring information of a lane in which the electric vehicle is currently traveling by means of the GPS; and the electric vehicle selectively enters a forced adaptive driving mode or an optional adaptive driving mode, based on endurance mileage of the electric vehicle, the information of the location of the charging pile or the destination and the information of the lane.

Figure 3:
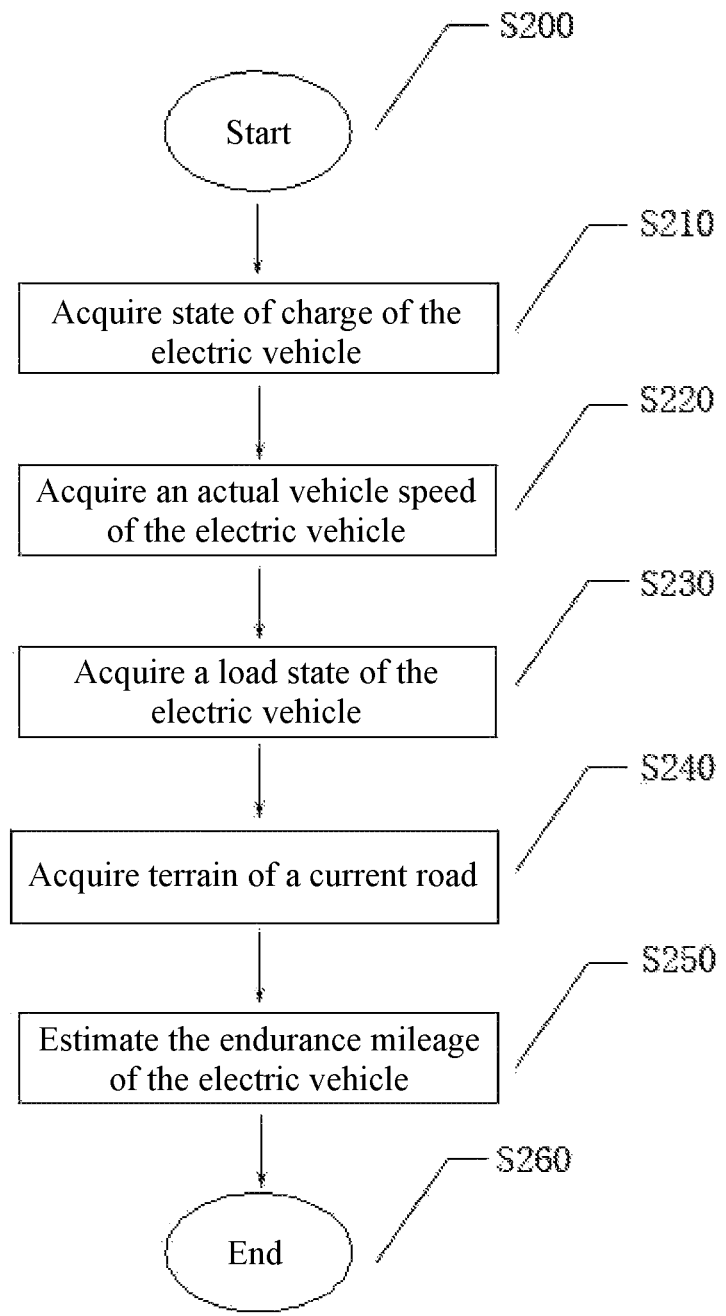
FIG. 3 is a flow chart of a method for estimating endurance mileage according to the invention.

As shown in FIG. 3, in the technical solution of the invention, the step of estimating an endurance mileage of the electric vehicle further comprises: acquiring state of charge of the electric vehicle; acquiring an actual vehicle speed of the electric vehicle; acquiring a load state of the electric vehicle; acquiring terrain of a current road; and estimating the endurance mileage of the electric vehicle based on the state of charge, the actual vehicle speed, the load state and the terrain of the current road.

Preferably, the information of the lane includes an average vehicle speed, terrain and a speed limit, and the load state includes an air conditioning state and a low-voltage load state. Specifically, the terrain may be information such as uphill, downhill, turning and road surface evenness. The low-voltage load may be the power consumption of accessories such as a radio, a CD player and lighting lamps.

More preferably, when the distance between the electric vehicle and the charging pile or the destination is greater than the endurance mileage, or when the distance between the electric vehicle and the charging pile or the destination is less than the endurance mileage but the difference therebetween reaches a threshold distance, the electric vehicle enters the forced adaptive driving mode. The destination herein may be an energy supply station such as a battery swap station, and can also be other places that the driver wants to reach. Most preferably, the vehicle directly determines the destination as the nearest charging pile or battery swap station when the conditions for entering the forced adaptive driving mode are satisfied, as avoiding breaking down from power shortage is the first consideration for the electric vehicle.

More preferably, when the state of charge of the electric vehicle is less than threshold state of charge and the average vehicle speed is greater than a threshold vehicle speed, the electric vehicle enters the optional adaptive driving mode. The threshold state of charge can be, for example, 30% of the full charge. Of course, this ratio can be adjusted as needed.

More preferably, when the conditions for entering the forced adaptive driving mode and for entering the optional adaptive driving mode are simultaneously satisfied, the electric vehicle preferentially enters the forced adaptive driving mode. As described above, avoiding breaking down from power shortage is a first consideration for the electric vehicle, so the forced adaptive driving mode has a higher priority than the optional adaptive driving mode.

More preferably, the threshold vehicle speed is 40 KM/hour, and the threshold distance is from 10 to 30 KM. As described above, electric vehicles with different parameters generally achieve the maximum endurance mileage at the speed of about 40 KM/hour, and therefore, determining the threshold vehicle speed as 40 KM/hour contributes to the determination and execution of the endurance mileage extending operation. In addition, the threshold distance is mainly set as a precaution against a situation where the road condition continues to deteriorate after the vehicle enters the forced adaptive driving mode, so the distance can be adjusted according to the daily road condition of the area through which the vehicle is traveling, preferably ranging from 10 to 30 KM.

More preferably, when the electric vehicle enters the forced adaptive driving mode while satisfying the condition for the optional adaptive driving mode, the electric vehicle cruises at a constant speed of 40 KM/hour with hazard warning flashers turned on. Otherwise, when the electric vehicle enters the forced adaptive driving mode but does not satisfy the condition for the optional adaptive driving mode, the electric vehicle travels at the average vehicle speed with the hazard warning flashers turned on. As described above, when the electric vehicle is to enter the optional adaptive driving mode, the electric vehicle first prompts the driver that it is possible to enter the optional adaptive driving mode to increase the endurance mileage, and the driver decides whether to enter the mode or not.

Heretofore, the technical solutions of the invention have been described with reference to the preferred embodiments shown in the accompanying drawings. However, those skilled in the art can readily understand that the protection scope of the invention is obviously not limited to these particular embodiments. Without departing from the principle of the invention, a person skilled in the art may make equivalent modifications or substitutions to related technical features, and the technical solutions after these modifications or substitutions shall fall within the scope of protection of the invention. For example, the adaptive driving behavior adjusting method of the invention may be performed by any suitable controller, such as an ECU, that controls the driving mode of an electric vehicle. Any changes made in this regard do not depart from the principles of the invention and therefore shall fall within the scope of the invention. Furthermore, although the application describes the adaptive driving behavior adjusting method of the invention in a particular order, the invention is obviously not limited to this particular order, and those skilled in the art can adjust the order as needed without changing the basic principles.

What is claimed is:

1. An adaptive driving behavior adjusting method for an electric vehicle, which is performed by an engine control unit (ECU) of the vehicle, comprising the steps of:
   estimating an endurance mileage of the electric vehicle by the ECU;
   acquiring information of a location of the nearest charging pile or a destination through a navigation positioning system or real traffic reports;
   acquiring information of a lane in which the electric vehicle is currently traveling through the navigation positioning system or real traffic reports; and
   the electric vehicle to selectively entering a forced adaptive driving mode or an optional adaptive driving mode, based on the endurance mileage of the electric vehicle, the information of the location of the charging pile or the destination and the information of the lane,
   wherein when the distance between the electric vehicle and the charging pile or the destination is greater than the endurance mileage but the difference therebetween is less than an upper threshold distance, or when the distance between the electric vehicle and the charging pile or the destination is less than the endurance mileage but the difference therebetween reaches a lower threshold distance, the electric vehicle enters the forced adaptive driving mode.

2. The adaptive driving behavior adjusting method according to claim 1, wherein the step of estimating an endurance mileage of the electric vehicle further comprises:
acquiring state of charge of the electric vehicle;
acquiring an actual vehicle speed of the electric vehicle;
acquiring a load state of the electric vehicle;
acquiring terrain of a current road; and
estimating the endurance mileage of the electric vehicle based on the state of charge, the actual vehicle speed, the load state and the terrain of the current road.

3. The adaptive driving behavior adjusting method according to claim 2, wherein the information of the lane includes an average vehicle speed, the terrain, and a speed limit, and/or the load state includes an air conditioning state and a low-voltage load state.

4. The adaptive driving behavior adjusting method according to claim 3, wherein when the state of charge of the electric vehicle is less than threshold state of charge and the average vehicle speed is greater than a threshold vehicle speed, the electric vehicle enters the optional adaptive driving mode.

5. The adaptive driving behavior adjusting method according to claim 4, wherein when the conditions for entering the forced adaptive driving mode and for entering the optional adaptive driving mode are simultaneously satisfied, the electric vehicle preferentially enters the forced adaptive driving mode.

6. The adaptive driving behavior adjusting method according to claim 5, wherein the threshold vehicle speed is 40 KM/hour; and/or the lower threshold distance is from 10 to 30 KM.

7. The adaptive driving behavior adjusting method according to claim 6, wherein when the electric vehicle enters the forced adaptive driving mode while satisfying the condition for the optional adaptive driving mode, the electric vehicle cruises at a constant speed of 40 KM/hour with hazard warning flashers turned on.

8. The adaptive driving behavior adjusting method according to claim 7, wherein when the electric vehicle enters the forced adaptive driving mode but does not satisfy the condition for the optional adaptive driving mode, the electric vehicle travels at the average vehicle speed with the hazard warning flashers turned on.

9. The adaptive driving behavior adjusting method according to claim 8, wherein when the electric vehicle enters the optional adaptive driving mode, the electric vehicle prompts the driver to confirm whether to enter the optional adaptive driving mode in order to increase the endurance mileage.

* * * * *